(12) United States Patent
Liu (10) Patent No.: US 11,164,293 B2
(45) Date of Patent: Nov. 2, 2021

(54) ADAPTIVE ENHANCEMENT METHOD FOR IMAGE CONTRAST BASED ON LEVEL OF DETAIL

(71) Applicant: National Cheng Kung University, Tainan (TW)

(72) Inventor: Cheng-Chien Liu, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 85 days.

(21) Appl. No.: 16/749,311

(22) Filed: Jan. 22, 2020

(65) Prior Publication Data
US 2020/0242741 A1 Jul. 30, 2020

Related U.S. Application Data

(60) Provisional application No. 62/798,789, filed on Jan. 30, 2019.

(51) Int. Cl.
*G06T 5/00* (2006.01)
*G06T 5/50* (2006.01)
*G06T 7/174* (2017.01)

(52) U.S. Cl.
CPC ............. *G06T 5/007* (2013.01); *G06T 5/50* (2013.01); *G06T 7/174* (2017.01); *G06T 2207/20021* (2013.01); *G06T 2207/20161* (2013.01)

(58) Field of Classification Search
CPC ........... G06T 5/007; G06T 5/50; G06T 7/174; G06T 2207/20021; G06T 2207/20161;
(Continued)

(56) References Cited

U.S. PATENT DOCUMENTS

| 6,173,084 B1 * | 1/2001 | Aach | G06T 5/20 382/260 |
| 6,522,337 B1 * | 2/2003 | Morioka | G06T 15/04 345/582 |

(Continued)

OTHER PUBLICATIONS

Li, Y., et al., "An Effective Approach to Remove Cloud-fog Cover and Enhance Remotely Sensed Imagery," Proceedings of 2005 IEEE International Geoscience and Remote Sensing Symposium (IGARSS '05), Jul. 2005.*

*Primary Examiner* — Xuemei G Chen
(74) *Attorney, Agent, or Firm* — Chun-Ming Shih; HDLS IPR Services (57) ABSTRACT

A level of detail-transformation adaptive enhancement method for image contrast includes: dividing a remote sensing image into a plurality images of different levels of detail, the lowest level of detail defined as L and the highest level of detail defined as H, and gradually transforming an image $Image_i$ of an arbitrary level of detail i between the image $Image_H$ of the highest level of detail H and the image $Image_L$ of the lowest level of detail L from $Image_L$ to $Image_H$ through the following equation: $Image_i = R_i \times Image_H + (1 - R_i) \times Image_L$. The image $Image_H$ of the highest level of detail H is an image $Image_{ACE}$ produced with adaptive contrast enhancement processing, or an image produced with a contrast enhancement method such as Gaussian or histogram equalization; the image $Image_L$ of the lowest level of detail L is an image $Image_{LCE}$ produced by common linear contrast enhancement.

5 Claims, 6 Drawing Sheets
(5 of 6 Drawing Sheet(s) Filed in Color)

S91: A remote sensing image is divided into a plurality images of different levels of detail, the lowest level of detail in the plural levels of detail is defined as L, the highest level of detail is defined as H, and an image $Image_i$ of an arbitrary level of detail i between the image $Image_H$ of the highest level of detail H and the image $Image_L$ of the lowest level of detail L is gradually transformed from $Image_L$ to $Image_H$ through the following equation: $Image_i = R_i \times Image_H + (1-R_i) \times Image_L$ S92: $Image_H$ is subjected to adaptive contrast enhancement processing to produce an image $Image_{ACE}$, or is processed with a contrast enhancement method such as Gaussian or histogram equalization; $Image_L$ is subjected to common linear contrast enhancement to produce an image $Image_{LCE}$ S93: The weight $R_i$ of $Image_H$ is derived from the linear transformation relation $R_i = (i-L)/(H-L)$; from the power transformation relation $R_i = [(i-L)/(H-L)]^n$, where n is an arbitrary number greater than 0 and smaller than 1; or from another non-linear relation in order to obtain a plurality images of different levels of detail with different degrees of enhancement (58) Field of Classification Search
CPC . G06T 2207/10024; G06T 2207/10032; G06T 2207/20004; G06T 5/40
See application file for complete search history.

(56) References Cited

U.S. PATENT DOCUMENTS

| | | | | |
|---|---|---|---|---|
| 8,619,083 | B2* | 12/2013 | Nickolov | G06T 3/40 345/428 |
| 10,748,241 | B2* | 8/2020 | Pieters | H04L 65/607 |
| 2008/0129752 | A1* | 6/2008 | Riley | G06T 5/50 345/629 |
| 2008/0144931 | A1* | 6/2008 | Yan | G06T 5/40 382/168 |
| 2008/0303841 | A1* | 12/2008 | Newhall, Jr. | G06T 15/005 345/587 |
| 2009/0195541 | A1* | 8/2009 | Peng | G06T 15/005 345/420 |
| 2010/0091028 | A1* | 4/2010 | Grossman | G06T 15/04 345/587 |
| 2010/0142790 | A1* | 6/2010 | Chang | G06T 5/009 382/132 |
| 2013/0083026 | A1* | 4/2013 | Lethers | G06T 3/40 345/428 |
| 2014/0267346 | A1* | 9/2014 | Ren | G06T 15/04 345/582 |
| 2015/0154784 | A1* | 6/2015 | Hensel | G06T 13/80 345/672 |
| 2016/0104301 | A1* | 4/2016 | Liu | G06T 5/50 382/162 |
| 2016/0155218 | A1* | 6/2016 | Svensson | G06T 5/40 382/165 |
| 2016/0292837 | A1* | 10/2016 | Lakemond | G06T 5/20 |
| 2017/0083762 | A1* | 3/2017 | Segalovitz | G06K 9/00463 |
| 2017/0148205 | A1* | 5/2017 | Sunkavalli | G06T 15/04 |
| 2017/0301075 | A1* | 10/2017 | Chiang | G06T 5/40 |
| 2019/0043171 | A1* | 2/2019 | Yahata | G06T 5/50 |
| 2019/0331831 | A1* | 10/2019 | Chen | G01W 1/06 |
| 2020/0143516 | A1* | 5/2020 | Martin | G06T 3/60 |
| 2020/0187911 | A1* | 6/2020 | Park | A61B 8/587 |
| 2020/0265566 | A1* | 8/2020 | Glotzbach | G06T 5/002 |
| 2020/0302582 | A1* | 9/2020 | Smirnov | G06T 5/008 |

* cited by examiner

FIG. 5(a) LOD=7
FIG. 5(b) LOD=9
FIG. 5(c) LOD=10
FIG. 5(d) LOD=11
FIG. 5(e) LOD=13
FIG. 5(f) LOD=14

LOD=10

LOD=12

LOD=14

ADAPTIVE ENHANCEMENT METHOD FOR IMAGE CONTRAST BASED ON LEVEL OF DETAIL

FIELD OF THE INVENTION

The present invention is directed to an adaptive enhancement method for image contrast, and more particularly to a level of detail-transformation adaptive enhancement method for image contrast.

BACKGROUND OF THE INVENTION

Exchanging geospatial information and particularly large amounts of remote sensing imagery through internet, is an efficient approach to provide such knowledge to the general public and decision makers. For example, commercial companies like Microsoft and Google are providing web mapping services to the general public through their Bing and Google Map/Earth platform, respectively; Government agencies like the European Space Agency (ESA) and the United States Geological Survey (USGS) are sharing their satellite images to the registered users through some web-based systems powered by OpenLayers and/or Google Maps/Earth application program interfaces. Since everyone around the world can freely access these platforms via his/her web browser, without purchasing or installing expensive software, more and more data owners would like to distribute their geospatial data or remote sensing optical imagery through these systems.

To share through internet, one crucial and common procedure is to convert a large remote sensing imagery to a set of pyramid images/tiles, namely superoverlay. All tiles are stored in a cloud-based server and the user can browse any region of this image at different levels of detail through the internet following the standard technical approach proposed more than a decade ago. Since only a few tiles need to be transmitted and no calculation is actually conducted at the server end, one machine can serve many users simultaneously. Note that these tiles can be distributed and browsed via devices like mobile phones, tablets, and desktop computers as well.

The most intuitive and direct impression of quickly browsing the image tiles through the internet is related to their visual effect: a better contrast would enable us to retrieve more information from the image. Since approximately 52% of Earth is covered by clouds at any moment, the contrast of satellite imagery is usually not ideal. Consequently, the surface features are not presented with the optimized visual effect and the situations are even worse for the case of cirrocumulus clouds. Only the cloudless scenes are included and presented in the existing Google Map/Earth. Most of the acquired satellite images with partially covered clouds are not fully utilized either. Considering the tremendous amount of resource and efforts that have been spent and/or planned to make more observations of earth from space, it is equally important but usually overlooked to develop an approach to make the best use of all collected images from space, regardless of the cloud coverage.

SUMMARY OF THE INVENTION

An objective of the present invention is to provide a novel satellite remote sensing image processing technique that, regardless of cloud cover percentage, can properly enhance image contrast for each level of detail (LOD) in order for the processed image to show the features of the Earth's surface with optimized visual effects. A comparison between some satellite remote sensing images currently available on the European Space Agency and the United States Geological Survey platforms and the same images processed by the novel process shows that the novel process does provide satellite remote sensing images—especially those with partial cloud coverage or cirrocumulus cloud coverage—with better visual effects and higher contrast spectral information. This novel processing technique, therefore, can remove the limitations that satellite remote sensing images presently available on such network platforms as Google Maps/Earth for viewing and sharing are restricted to those with zero or low cloud cover percentage, and that most of the satellite remote sensing images, either with high cloud cover percentage or partial cloud coverage, always have problems of not being sufficiently used. Not only can future global satellite remote sensing images be processed with this novel process, but existing images can also be reprocessed with the same process to enable sufficient use of those precious images. The processing method of the present invention includes the following contents.

A level of detail-transformation adaptive enhancement method for image contrast includes: dividing a remote sensing image into a plurality images of different levels of detail, the lowest level of detail in the plural levels of detail defined as L and the highest level of detail defined as H, and gradually transforming an image $Image_i$ of an arbitrary level of detail i between the image $Image_H$ of the highest level of detail H and the image $Image_L$ of the lowest level of detail L from $Image_L$ to $Image_H$ through the following equation: $Image_i = R_i \times Image_H + (1-R_i) \times Image_L$.

Preferably, the image $Image_H$ of the highest level of detail H is an image $Image_{ACE}$ produced with adaptive contrast enhancement processing, or an image produced with a contrast enhancement method such as Gaussian or histogram equalization, the goal being to reduce the limitations imposed by cloud and fog on the dynamic range of image contrast and to show the features of the Earth's surface with optimized visual effects.

Preferably, the image $Image_L$ of the lowest level of detail L is an image $Image_{LCE}$ produced by common linear contrast enhancement, common linear contrast enhancement being used instead of a much stronger contrast enhancement method because the latter tends to result in rather unreal tones as can be found when the entire image of a relatively low level of detail is viewed.

Preferably, when the image $Image_H$ of the highest level of detail H is the image $Image_{ACE}$, which is produced by adaptive contrast enhancement processing, and the image $Image_L$ of the lowest level of detail L is the image $Image_{LCE}$, which is produced by common linear contrast enhancement, the foregoing equation can be rewritten as: $Image_i = R_i \times Image_{ACE} + (1-R_i) \times Image_{LCE}$.

Preferably, the weight $R_i$ of $Image_H$ is derived from the linear transformation relation $R_i = (i-L)/(H-L)$, the processing method being referred to as the LOD linear transformation-based adaptive image contrast enhancement method.

Preferably, the weight $R_i$ of $Image_H$ is derived from the power transformation relation $R_i = [(i-L)/(H-L)]^n$, where n is an arbitrary number greater than 0 and smaller than 1, the processing method being referred to as the LOD power transformation-based adaptive image contrast enhancement method.

Preferably, the weight $R_i$ of $Image_H$ is derived from another non-linear relation in order to obtain a plurality images of different levels of detail with different degrees of enhancement, the processing method being referred to as the LOD non-linear transformation-based adaptive image contrast enhancement method.

Preferably, the image $Image_i$ of an arbitrary level of detail i is obtained by computing the equation $Image_i = R_i \times Image_{ACE} + (1-R_i) \times Image_{LCE}$, and each resulting image is cut into tiles so that, when the processed image is browsed on a network platform and switched between different levels of detail, additional partial image enhancement can be dispensed with to increase the image displaying efficiency of the network platform.

According to the present invention, a remote sensing image is divided into a plurality images of different levels of detail, the lowest level of detail in the plural levels of detail is defined as L, and the highest level of detail is defined as H. The image $Image_i$ of an arbitrary level of detail i between the image $Image_H$ of the highest level of detail H and the image $Image_L$ of the lowest level of detail L is gradually transformed from $Image_L$ to $Image_H$ through the following equation: $Image_i = R_i \times Image_H + (1-R_i) \times Image_L$. As such, regardless of cloud cover percentage, image contrast for each level of detail can be properly enhanced in order for the processed image to show the features of the Earth's surface with optimized visual effects.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

The detailed description and preferred embodiments of the invention will be set forth in the following content, and provided for people skilled in the art to understand the characteristics of the invention.

Figure 1:
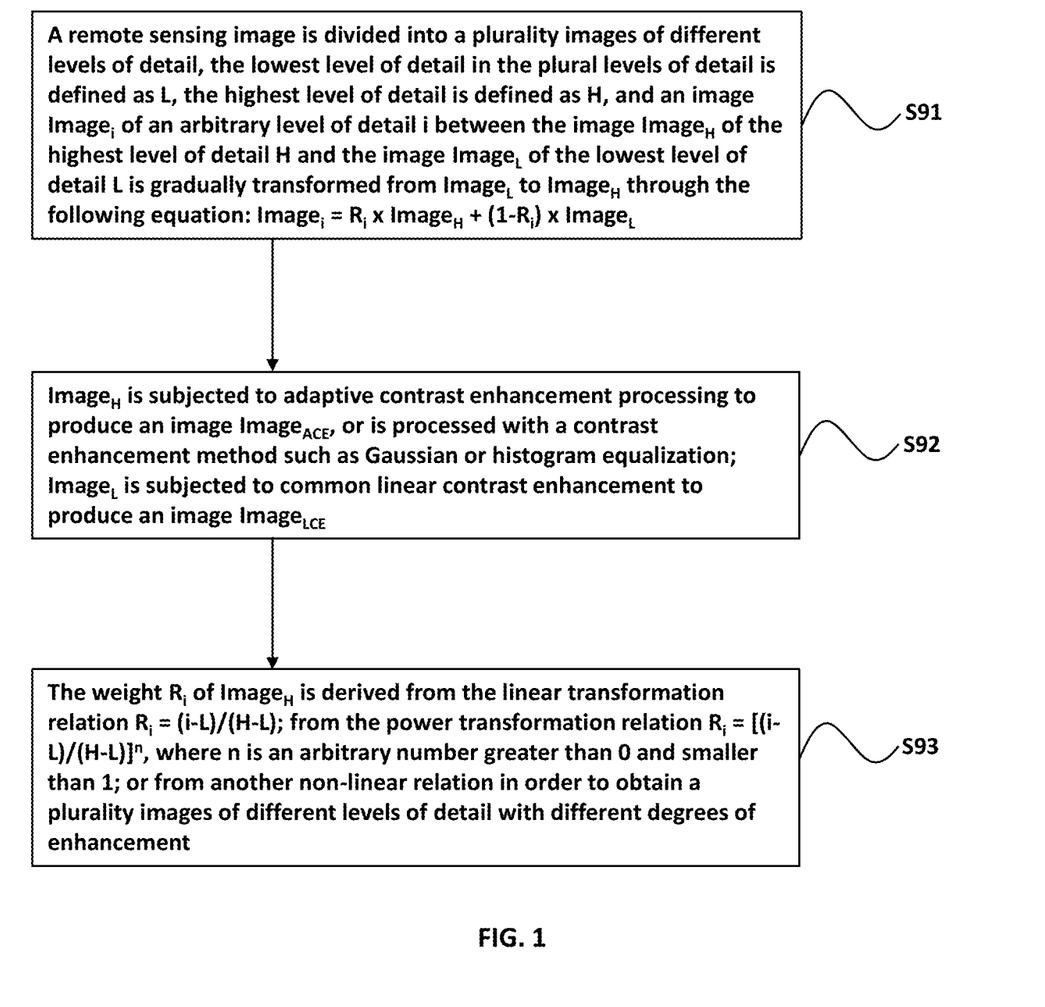
FIG. 1 is a flowchart illustrating an embodiment of the level of detail-transformation adaptive enhancement method for image contrast according to the present invention.

Please refer to FIG. 1 for the level of detail-transformation adaptive enhancement method for image contrast according to the present invention.

Although adaptive contrast enhancement (ACE) technique has been employed, additional modification and integration are required for processing a large remote sensing imagery.

Contrast enhancement is a widely-used technique of digital image processing for applications that the subjective quality of images is important for human interpretation. It is also a crucial processing to ensure the quality of visual effect for remote sensing optical images from acquisition to users. Although the general and straightforward approach of linear contrast enhancement (LCE) can provide a clear contrast for most of the land use and land cover (LULC), clouds and hazes that are frequently found on a remote sensing optical image inevitably limit the dynamic range of contrast and deteriorate the quality of visual effect. Unless they can be masked out completely, a small patch of cloud or haze would render the linear contrast enhancement approach invalid.

As demonstrated previously by the present inventor, this problem can be tackled by masking out clouds and applying the adaptive contrast enhancement technique to those regions without cloud masking, and then adding back the cloud mask with a saturated value. The adaptive contrast enhancement technique assigns each pixel to an intensity proportional to its rank within the surrounding neighborhood. Even though the clouds/hazes cannot be masked out completely, the contrast can be stretched well by considering the rank of each pixel. The noise over-enhancement in nearly homogeneous regions can be reduced by setting the size of the overlapped tiles as a fraction of the largest dimensions of the image size, as well as limiting the slope of histogram. This method has proven to be broadly applicable to a wide range of images and to have demonstrated effectiveness.

To begin with, step 91 is performed to divide a remote sensing image into a plurality images of different levels of detail and to define the lowest level of detail (lowest LOD) in the plural levels of detail as L and the highest level of detail (highest LOD) as H. The image $Image_i$ of an arbitrary level of detail i between the image $Image_H$ of the highest level of detail H and the image $Image_L$ of the lowest level of detail L is gradually transformed from $Image_L$ to $Image_H$ through the following equation: $Image_i = R_i \times Image_H + (1-R_i) \times Image_L$.

In the following step 92, $Image_H$ is subjected to adaptive contrast enhancement processing to produce an image $Image_{ACE}$, or is processed with a contrast enhancement method such as Gaussian or histogram equalization, the goal being to reduce the limitations imposed by cloud and fog on the dynamic range of image contrast and to show the features of the Earth's surface with optimized visual effects. $Image_L$, on the other hand, is subjected to common linear contrast enhancement to produce an image $Image_{LCE}$. Here, common linear contrast enhancement is used instead of a much stronger contrast enhancement method because the latter tends to result in rather unreal tones as can be found when the entire image of a relatively low-LOD is viewed.

When the image $Image_H$ of the highest-LOD H is the image $Image_{ACE}$, which is produced by adaptive contrast enhancement processing, and the image $Image_L$ of the lowest-LOD L is the image $Image_{LCE}$, which is produced by common linear contrast enhancement, the foregoing equation can be rewritten as: $Image_i = R_i \times Image_{ACE} + (1-R_i) \times Image_{LCE}$.

In that case, the image $Image_i$ of an arbitrary level of detail i is obtained by computing the equation $Image_i = R_i \times Image_{ACE} + (1-R_i) \times Image_{LCE}$, and each resulting image is cut into tiles so that, when the processed image is browsed on a network platform and switched between different levels of detail, additional partial image enhancement can be dispensed with to increase the image displaying efficiency of the network platform.

In the last step 93, image contrast enhancement is performed on each image of the to-be-processed level of detail in a progressive manner. The weight $R_i$ of $Image_H$ can be derived from the linear transformation relation $R_i = (i-L)/(H-L)$ (in which case the processing method is referred to as the LOD linear transformation-based adaptive image contrast enhancement method); or from the power transformation relation $R_i=[(i-L)/(H-L)]^n$, where n is an arbitrary number greater than 0 and smaller than 1 (in which case the processing method is referred to as the LOD power transformation-based adaptive image contrast enhancement method); or from another non-linear relation in order to obtain a plurality images of different levels of detail with different degrees of enhancement (in which case the processing method is referred to as the LOD non-linear transformation-based adaptive image contrast enhancement method).

Figure 2A:
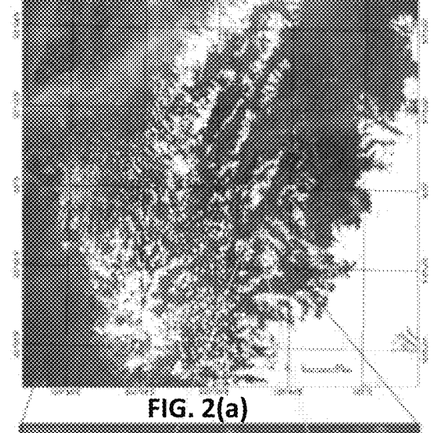
FIGS. 2(a)-2(f) are pictures showing images received linear contrast enhancement and the same images received adaptive contrast enhancement.
Figure 2B:
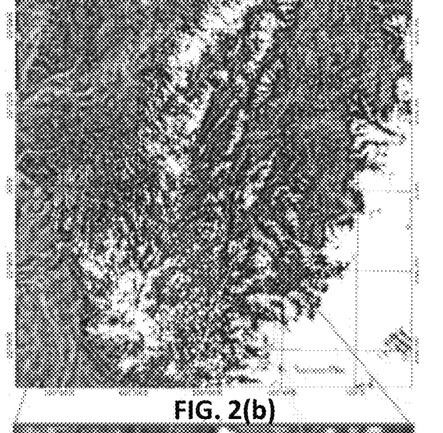
Figure 2C:
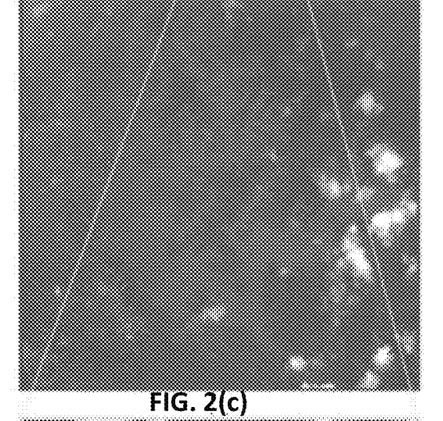
Figure 2D:
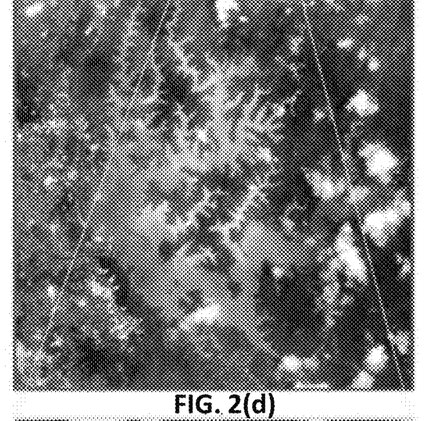
Figure 2E:
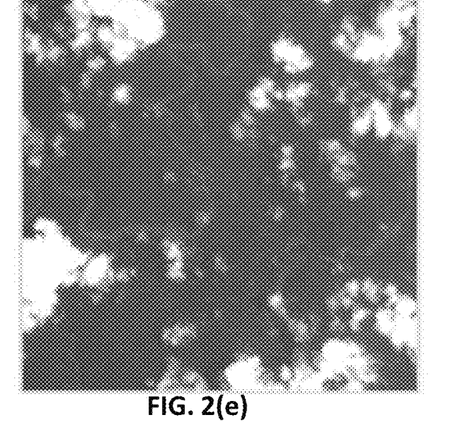
Figure 2F:
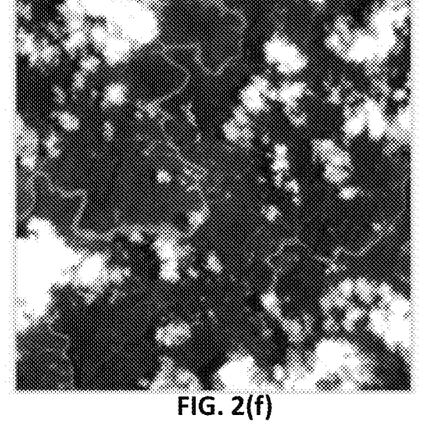
Figure 3A:
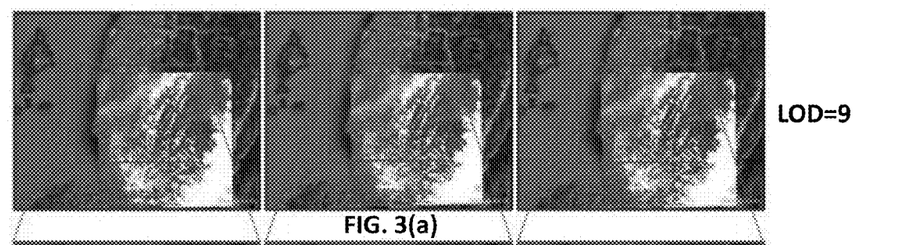
FIGS. 3(a)-3(f) are pictures showing images of different levels of detail received various contrast enhancement methods.
Figure 3B:
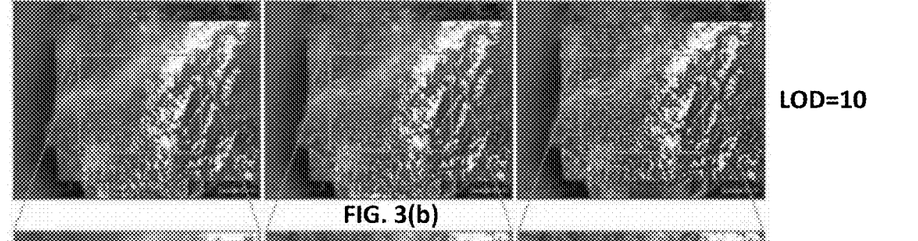
Figure 3C:
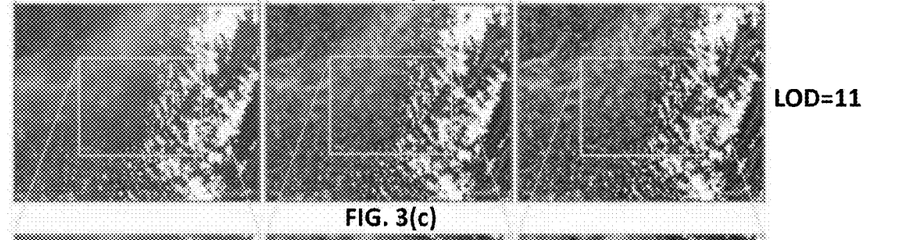
Figure 3D:
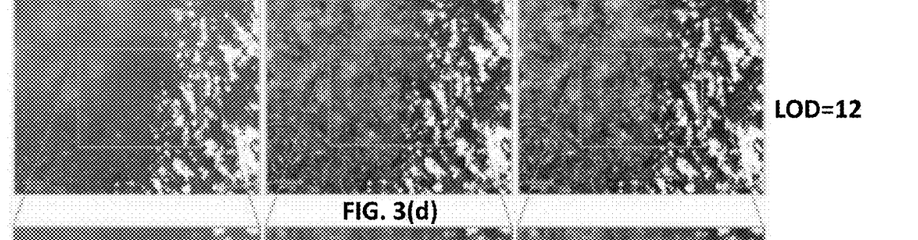
Figure 3E:
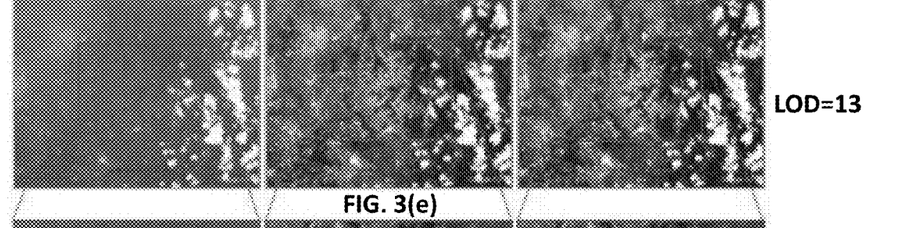
Figure 3F:
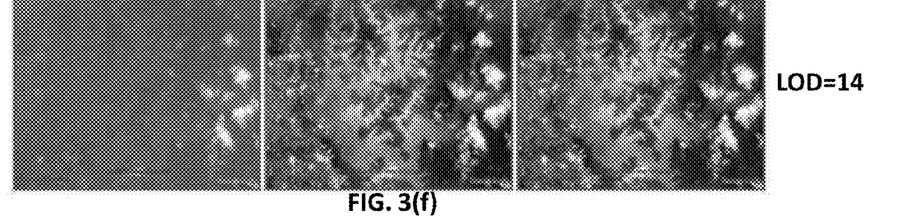
Figure 4A:
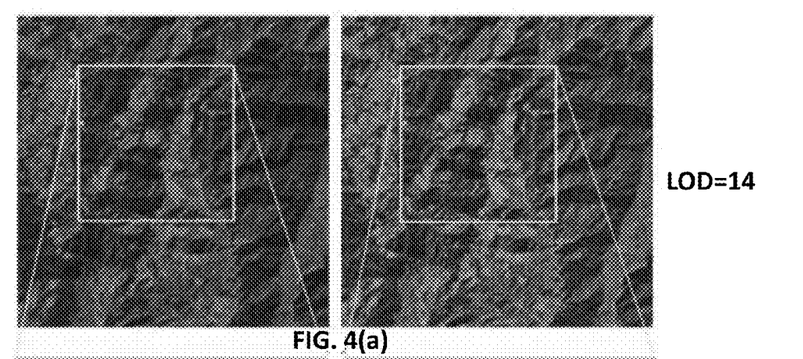
FIGS. 4(a)-4(d) are pictures showing the result of LOD linear transformation-based adaptive image contrast enhancement.
Figure 4B:
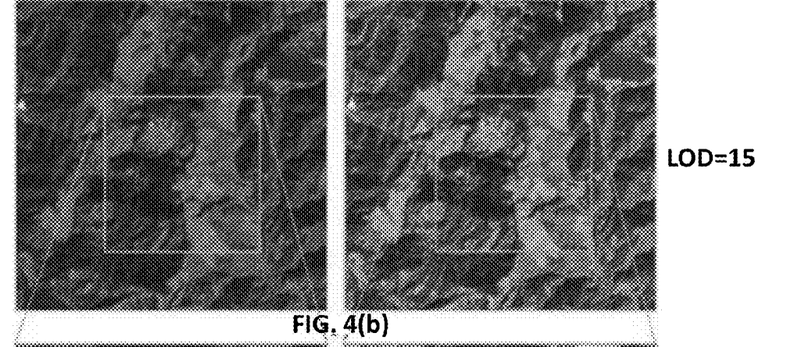
Figure 4C:
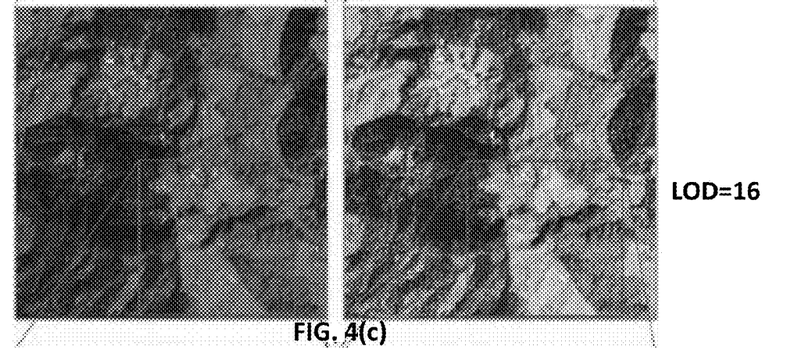
Figure 4D:
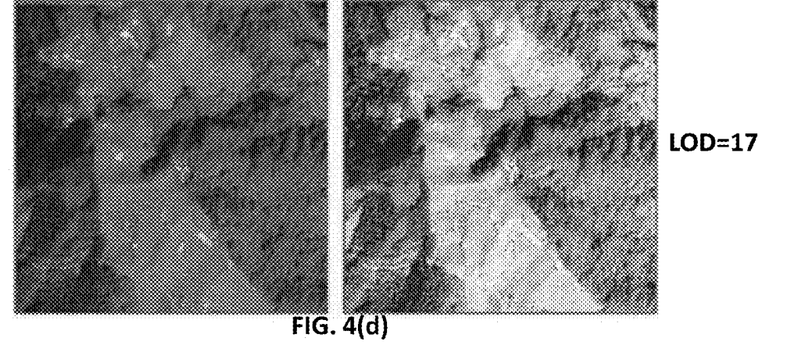

FIG. 2(a) to FIG. 2(f) show a standard Level-1C product of a true natural-color image T51QTF taken by Sentinel-2 on Jun. 15, 2019. More specifically, FIG. 2(a) is a true natural-color image that has received linear contrast enhancement, and FIG. 2(b) is a true natural-color image that has received adaptive contrast enhancement. A comparison between these two images shows that FIG. 2(b) does have better contrast than FIG. 2(a) regardless of cloud coverage or distribution. Parameters that were required to be set for the adaptive contrast enhancement were so determined as to ensure that the relatively dark and uniform pixels of the water area in the red boxes in FIG. 2(a) and FIG. 2(b) or of the vegetation area in the yellow boxes in FIG. 2(a) and FIG. 2(b) would not produce noticeable color spots due to over-enhancement. By examining the two images at full resolution (the highest-LOD), e.g., by comparing FIG. 2(c) and FIG. 2(e), which are the result of linear contrast enhancement, with FIG. 2(d) and FIG. 2(f), which are the result of adaptive contrast enhancement, it can be known that adaptive contrast enhancement is indeed effective in improving visual effects. The side effect of unreal image tones, however, does show when the entire image of a relatively low-LOD of, e.g., FIG. 2(b) is viewed.

As the remote sensing optical images are browsed through the web mapping service, its current level of detail and region are determined on-the-fly from the client end. Since the actions of zoom in and zoom out are equivalent to flip between tiles with different levels of detail, and only the related tiles fall within the current region are required to transmit and display, the remote sensing optical image can be browsed smoothly through the web, no matter how large its original size is. When the image is zooming across different levels of detail, the users are aware of the change of spatial resolution only, rather than the contrast. Because the entire set of pyramid images/tiles is cut/prepared from the same image, their contrasts are all kept the same. This motivates the idea of introducing different levels of enhancement for different levels of detail, namely LOD-based enhancement.

The water area in the red boxes in FIG. 2(a) and FIG. 2(b) is presented in FIG. 3(a) to FIG. 3(f) to facilitate discussion on the enhancement effects of the levels of detail. The image on the left column of each of FIG. 3(a) to FIG. 3(f) is the result of common linear contrast enhancement, whereas the image in the middle column of each of FIG. 3(a) to FIG. 3(f) is the result of processing with the LOD linear transformation-based adaptive image contrast enhancement method. It is worth mentioning that the original image is not only a true natural-color standard Level-1C product, but also a typical optical satellite-remote-sensing image affected by cirrocumulus cloud and smog. The images on the left column of each of FIG. 3(a) to FIG. 3(f), although produced from a true natural-color standard Level-1C product provided directly by Sentinel Hub, demonstrate that the limited dynamic range of common linear contrast enhancement leads to poor visual effects. By contrast, the images in the middle column of each of FIG. 3(a) to FIG. 3(f), i.e., images processed by the LOD transformation-based adaptive image contrast enhancement method, show the water area with increasing clarity as the level of detail rises from FIG. 3(a) to FIG. 3(f). It is noteworthy that the weight of $Image_{ACE}$ in this example is determined by linear transformation, and that the contrast-enhanced visual effects of levels of detail 9 to levels of detail 11 are not as prominent as those of levels of detail 12 to levels of detail 14. This suggests that the weight of $Image_{ACE}$ needs to be adjusted for different levels of detail.

To increase the weight of $Image_{ACE}$ for the relatively low-LOD and to reduce the weight of $Image_{ACE}$ for the relatively high-LOD, the equation for computing the weight of $Image_{ACE}$ is modified into power transformation: $Ri=[(i-L)/(H-L)]^n$, where n is an arbitrary number greater than 0 and smaller than 1.

The images on the right column each of FIG. 3(a) to FIG. 3(f) are the result of processing the same true natural-color image with the LOD power transformation-based adaptive image contrast enhancement method, with n being 0.5. More specifically, the images on the right column of each of FIG. 3(a) to FIG. 3(f) are levels of detail 9 to levels of detail 14 respectively. By comparing the right column images (which are the result of power transformation) and the middle column images (which are the result of linear transformation) of FIG. 3(a) to FIG. 3(f), it can be seen that the contrast-enhanced visual effects of levels of detail 9 to levels of detail 11 are significantly improved. This shows that linear transformation is helpful to optical remote-sensing images with zero or low cloud cover percentage, and that power transformation is suitable for optical remote-sensing images that are affected by cirrocumulus and smog. In fact, other forms of transformation, such as logarithmic transformation and root-mean-square transformation, are also applicable, provided that the concept of LOD transformation-based adaptive image contrast enhancement is adhered to.

The LOD-based enhancement approach is written in Interactive Data Language (IDL®) using some of Environment for Visualizing Images (ENVI®) library of built-in routines. It is currently installed on an ordinary PC-based server equipped with an Intel® Core™ i7-4790K (4.0-GHz) CPU (ASUS, Taipei, Taiwan), as well as a regular solid state disk. This new approach has been employed to assist the Soil and Water Conservation Bureau (SWCB) of Taiwan to process various sources of remote sensing optical imagery.

FIG. 4(a) to FIG. 4(d) show a mosaic of cloudless images of Taiwan taken by SPOT-6/7 in 2017. The left-column and right-column images of each of FIG. 4(a) to FIG. 4(d) are respectively the original mosaic and the result of processing with the LOD linear transformation-based adaptive image contrast enhancement method. While the 2017 SPOT-6/7 cloudless mosaic already has quite satisfactory contrast, the effect of applying the LOD linear transformation-based adaptive image contrast enhancement method is still significant. The target area becomes clearer and clearer as the level of detail is gradually switched from level of detail 14 to level of detail 17, i.e., from the right-column image of FIG. 4(a) to that of FIG. 4(d). It can therefore be inferred that the LOD linear transformation-based adaptive image contrast enhancement method can produce noticeable effects on optical remote-sensing images with zero or low cloud cover percentage.

Figure 5A:
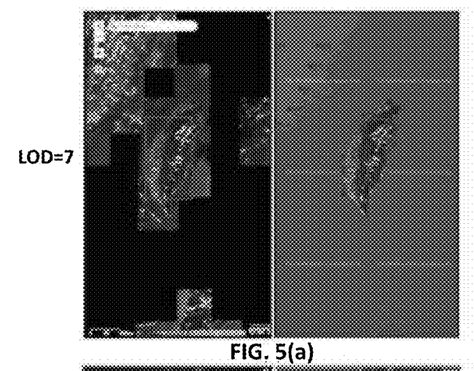
FIGS. 5(a)-5(f) are pictures showing the result of LOD linear transformation-based adaptive image contrast enhancement.
Figure 5B:
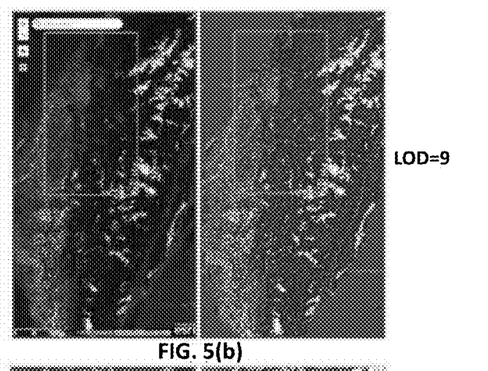
Figure 5C:
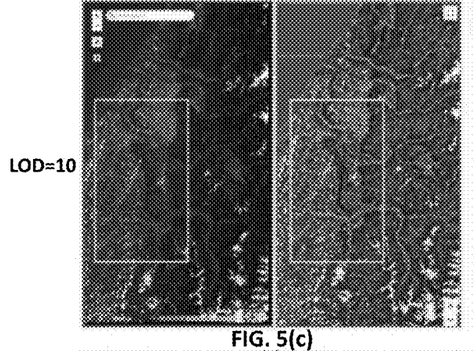
Figure 5D:
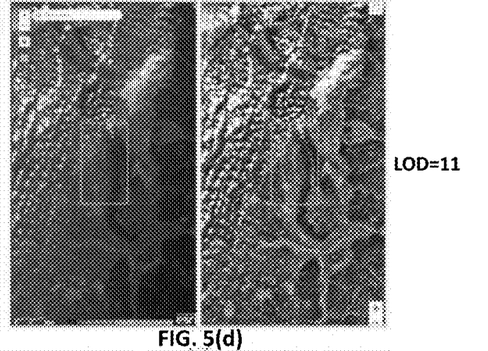
Figure 5E:
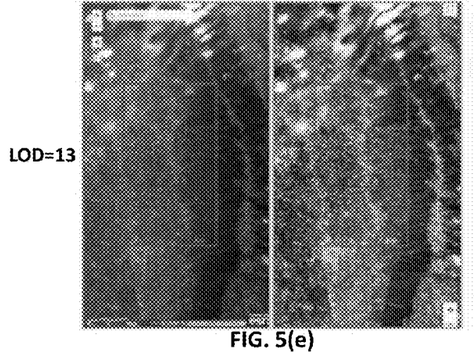
Figure 5F:
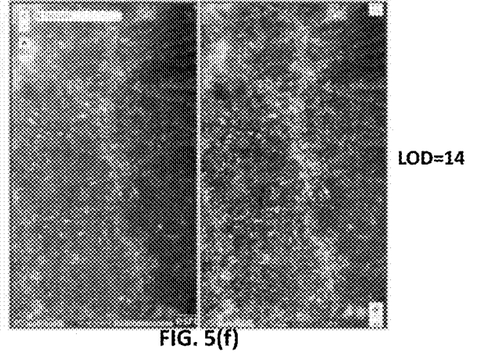

FIG. 5(a) to FIG. 5(f) show images of Taiwan taken by Sentinel-2 on Sep. 3, 2018 (FIG. 5(a) to FIG. 5(c)) and Jan. 11, 2020 (FIG. 5(d) to FIG. 5(f)). The left-column and right-column images of each of FIG. 5(a) to FIG. (f) are respectively a screenshot of the Sentinel Explorer website (https://sentinel2explorer.esri.com/, as browsed on Jan. 16, 2020) and the result of processing with the LOD linear transformation-based adaptive image contrast enhancement method. As the level of detail is sequentially switched from level of detail 7 to levels of detail 9, 10, 11, 13, and 14, i.e., from the right-column image of FIG. 5(*a*) to that of FIG. 5(*f*), the target area can be seen more and more clearly. It can therefore be inferred that the LOD linear transformation-based adaptive image contrast enhancement method can produce noticeable effects on optical satellite-remote-sensing images with partial cloud coverage or extensive cirrocumulus coverage.

Figure 6A:
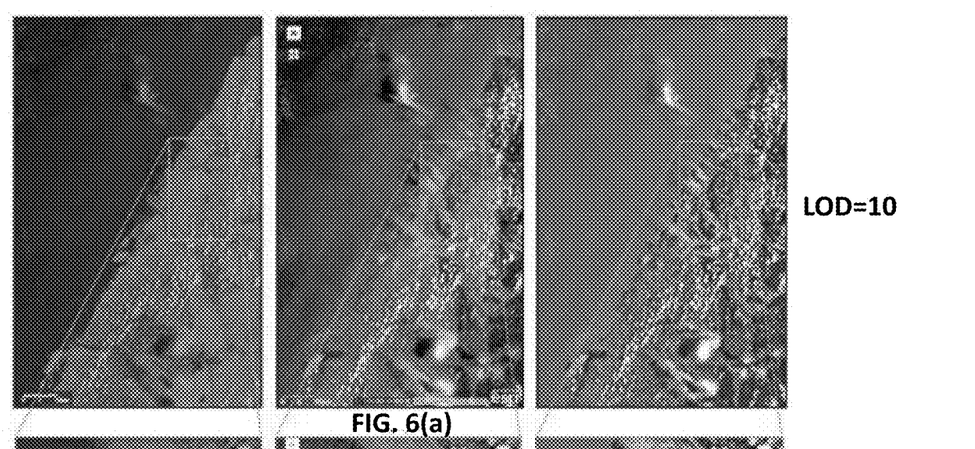
FIGS. 6(a)-6(c) are showing the result of LOD linear transformation-based adaptive image contrast enhancement.
Figure 6B:
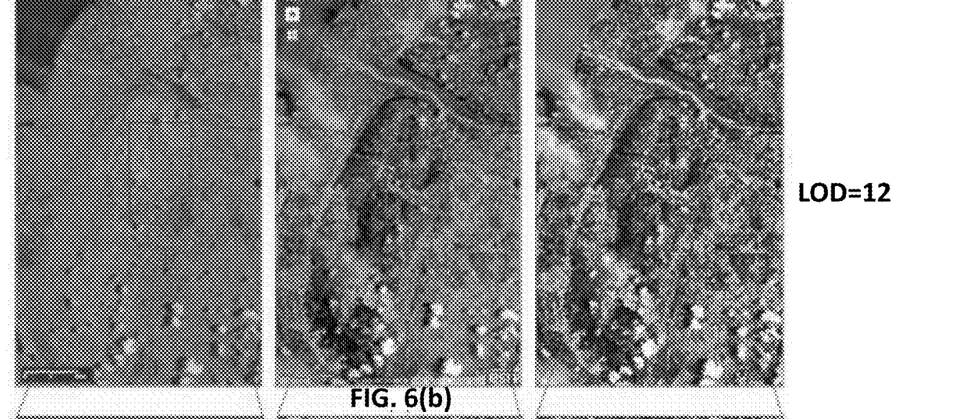
Figure 6C:
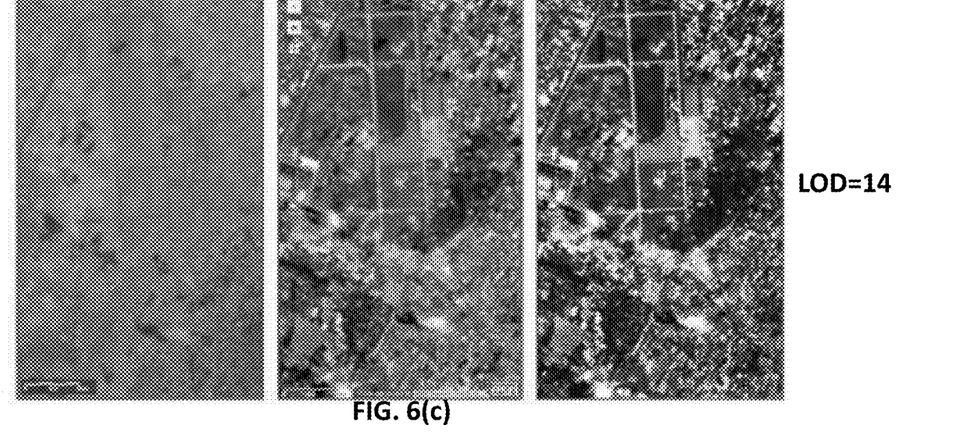

FIG. 6(*a*) to FIG. 6(*c*) show images of Taiwan taken by Landsat-8 on Jul. 29, 2019. The left-column, middle-column, and right-column images of each of FIG. 6(*a*) to FIG. 6(*c*) are respectively a screenshot of the USGS LandsatLook Viewer website (https://landsatlook.usgs.gov/viewer.html, as browsed on Jan. 16, 2020), a screenshot of the Landsat-Explorer website ((http://landsatexplorer.esri.com/, as browsed on Jan. 16, 2020), and the result of processing with the LOD linear transformation-based adaptive image contrast enhancement method. As the detail of level is sequentially switched from level of detail 10 to levels of detail 12 and 14, i.e., from the right-column image of FIG. 6(*a*) to that of FIG. 6(*c*), the target area can be seen more and more clearly. It can therefore be inferred that the LOD linear transformation-based adaptive image contrast enhancement method can produce noticeable effects on optical satellite-remote-sensing images with partial cloud coverage or extensive cirrocumulus coverage.

In summary of the above, the LOD transformation-based adaptive image contrast enhancement method of the present invention can enhance the image contrast of each of a plurality of to-be-processed levels of detail in a progressive manner and use the grey-scale values of the highest-solution target level of detail as the standard of contrast enhancement in order to produce a plurality images of different levels of detail whose degrees of enhancement vary from one to another. With the invention, one who is using Internet map services and wishes to view a map at various magnification ratios will be able to see images of optimal brightness and color saturation, or of great clarity in short, and the objective of the invention is thus achieved.

While the invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A level of detail-transformation adaptive enhancement method for image contrast, comprising:
   dividing a remote sensing image into a plurality images of different levels of detail, the lowest level of detail in the plural levels of detail defined as L and the highest level of detail defined as H, and gradually transforming an image $Image_i$ of an arbitrary level of detail i between the image $Image_H$ of the highest level of detail H and the image $Image_L$ of the lowest level of detail L from $Image_L$ to $Image_H$ through the following equation: $Image_i = R_i \times Image_H + (1-R_i) \times Image_L$, wherein $R_i$ is the weight of $Image_H$,
   wherein when the image $Image_H$ of the highest level of detail H is an image $Image_{ACE}$ produced by adaptive contrast enhancement processing, and the image $Image_L$ of the lowest level of detail L is an image $Image_{LCE}$ produced by common linear contrast enhancement, the equation is rewritten as: $Image_i = R_i \times Image_{ACE} + (1-R_i) \times Image_{LCE}$,
   wherein the image $Image_i$ of an arbitrary level of detail i is obtained by computing the equation $Image_i = R_i \times Image_{ACE} + (1-R_i) \times Image_{LCE}$, and then is cut into tiles so that, when the image $Image_i$ of an arbitrary level is browsed on a network platform and switched between different levels of detail, additional partial image enhancement is dispensed with to increase image displaying efficiency of the network platform.

2. The method as claimed in claim 1, wherein the image $Image_H$ of the highest level of detail H is an image $Image_{ACE}$ produced with adaptive contrast enhancement processing, or an image produced with a contrast enhancement method selected from Gaussian or histogram equalization to reduce limitations imposed by cloud and fog on dynamic range of image contrast and to show Earth's surface features with optimized visual effects.

3. The method as claimed in claim 1, wherein the image Images of the lowest level of detail L is an image $Image_{LCE}$ produced by common linear contrast enhancement to avoid rather unreal tones as can be found when an entire image of a relatively low level of detail is viewed.

4. The method as claimed in claim 1, wherein the weight Ri of $Image_H$ is derived from linear transformation relation: $Ri=(i-L)/(H-L)$.

5. The method as claimed in claim 1, wherein the weight $R_i$ of $Image_H$ is derived from power transformation relation: $R_i=[(i-L)/(H-L)]^n$, and n is an arbitrary number greater than 0 and smaller than 1.

* * * * *